(No Model.)
F. T. PINTER.
Bird Cage.
No. 229,634. Patented July 6, 1880.
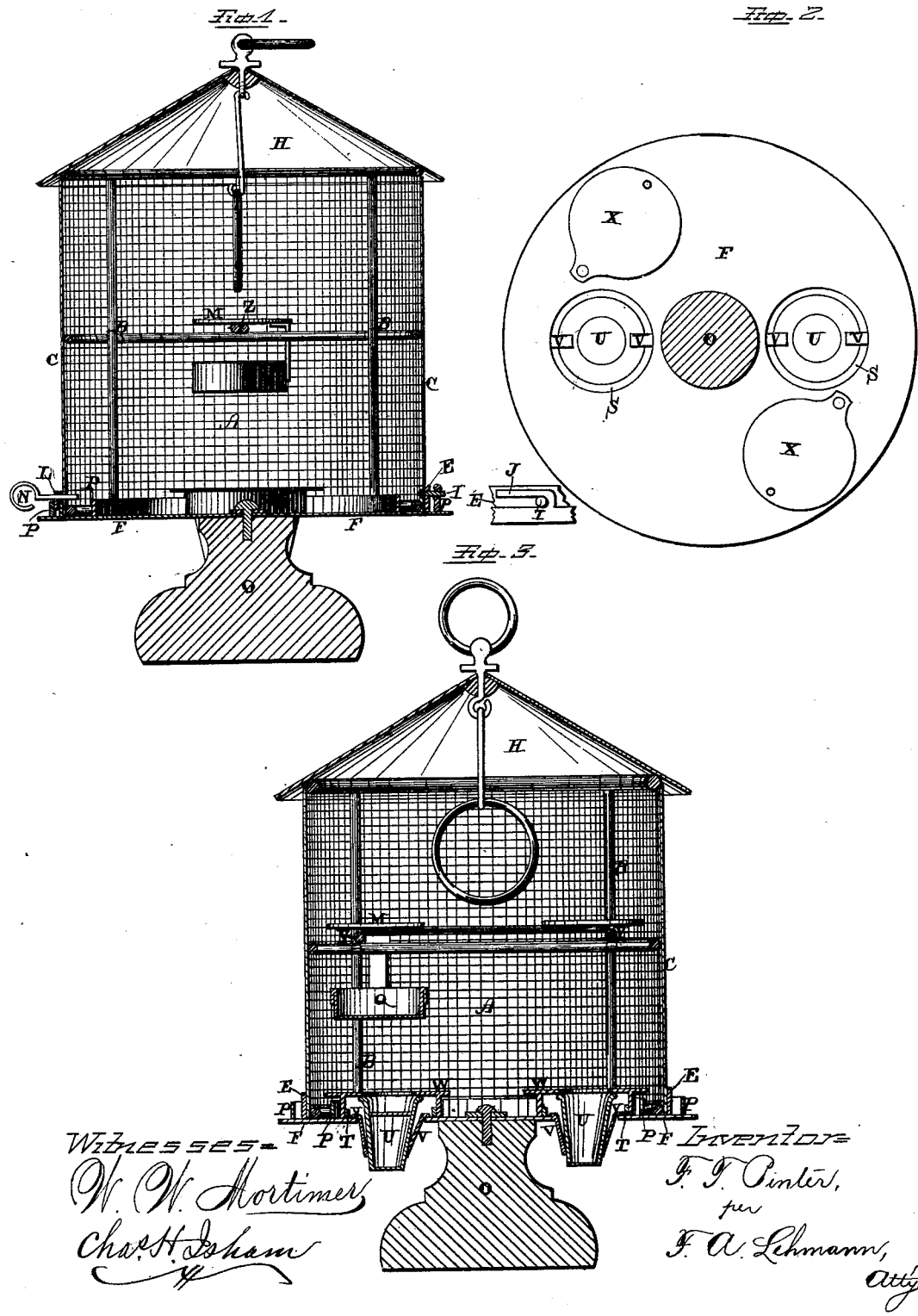
Witnesses:
W. W. Mortimer
Chas. H. Isham
Inventor:
F. T. Pinter,
per F. A. Lehmann,
Atty.

UNITED STATES PATENT OFFICE.

FRANCIS T. PINTER, OF SCHULENBURG, TEXAS.

BIRD-CAGE.

SPECIFICATION forming part of Letters Patent No. 229,634, dated July 6, 1880.

Application filed March 23, 1880. (No model.)

*To all whom it may concern:*

Be it known that I, F. T. PINTER, of Schulenburg, in the county of Fayette and State of Texas, have invented certain new and useful Improvements in Combined Bird-Cages and Fly-Traps; and I do hereby declare the following to be a full, clear, and exact description of the invention, such as will enable others skilled in the art to which it pertains to make and use it, reference being had to the accompanying drawings, which form part of this specification.

My invention relates to an improvement in combined bird-cages and fly-traps; and it consists in the use of wire gauze or netting, instead of the wires heretofore used, so as to keep out flies and insects, and in making holes through the bottom of the trap, through which the feed-cups are inserted, and through which holes the flies are admitted into the trap when the trap is being used to catch flies.

It further consists in making holes through the bottom of the cage and inserting the seed-cups therein, which cups are made considerably smaller than the openings, and are held in position by means of springs secured to their sides.

It further consists in placing a ring over the tops of the seed-cups and the flanges which surround the seed-cups, so as to prevent flies or insects from getting into the trap when it is being used as a bird-cage alone.

Figure 1 is a vertical section of my invention. Fig. 2 is an inverted view of the bottom of the cage. Fig. 3 is a vertical section taken at right angles to Fig. 1.

A represents the cage, which is made of wire netting or gauze instead of the wires generally employed for that purpose, and which netting is braced inside by means of the wires B, and on the outer side by means of the vertical braces C. This gauze is secured to a sheet-metal top, H, at its upper edge, and to the ring E at its bottom. This cage is secured to the bottom F by means of a pin, I, which projects out on one side of the ring E, and catches under a hook or catch, J, formed on one side of the bottom. Passing through the ear L, on the opposite side of the bottom from this hook or catch and through the ring on the bottom of the cage, is a pin, N.

This bottom is formed of sheet metal, and is provided with a foot or support, O, which keeps the cage raised a sufficient distance above the table to prevent the seed-cups from being interfered with when they are in position. Upon the top of this bottom are formed the two concentric flanges P, and the ring E on the bottom of the cage fits in between these two flanges, for the purpose of holding the cage more securely in position and forming a tight joint when the cage is used for a fly-trap alone. Through this bottom are cut two or more openings, S, and around each of these openings is formed a flange, T. These openings are considerably larger than is necessary to simply admit the upper ends of the seed-boxes U, and this extra space around the seed-boxes serves as an ingress for flies and other insects when the cage is being used as a fly-trap.

The seed-boxes are secured in position by means of the springs V, which are secured to their opposite sides, and which springs have their upper ends bent at right angles, so as to catch over the edges of the top. While supported in this position it is impossible for the boxes to be displaced by any movement of the bird or by any jarring of the cage.

When the cage is being used as a cage alone, and it is desired to keep flies and other insects out of the inside of the cage, a cap, W, is placed over the top of the flange T and the top of the seed-boxes, which caps have an opening through their centers, so as to give free access to the interior of the seed-cups.

When the seed-cups are removed from the cage for the purpose of being cleaned, the openings through the bottom of the cage are closed by means of a pivoted covering, X.

The perch for the bird is formed of two parallel wires, Y, which catch upon the inside wires of the cage and which are joined together by the wire Z. Fastened to this perch is the nest Q, which has a cover, M, placed above it.

Having thus described my invention, I claim—

1. The combination of a bird-cage having openings through its bottom for the insertion of the feed-cups with the feed-cups, which have their upper ends inserted through the openings and supported in place just above the bottom of the floor, substantially as shown.

2. The combination of the bottom of a bird-cage having openings through it for the insertion of the feed-cups, and provided with the flanges T around the said openings, with a perforated cap which fits over the flange and the feed-cup, so as to prevent the admission of flies and insects into the trap, substantially as set forth.

3. The combination of the seed-cups having the springs attached to their sides with the bottom of the cage having openings through it for the insertion of the upper ends of the cups, the said springs supporting the cups in position, substantially as shown and described.

In testimony that I claim the foregoing I have hereunto set my hand this 10th day of March, 1880.

FRANCIS T. PINTER.

Witnesses:
E. FALLENSTEIN,
W. G. FAY.